March 1, 1949. T. B. DILWORTH 2,463,025
PISTON
Filed Nov. 13, 1947 2 Sheets-Sheet 1

Inventor
Thomas B. Dilworth
By Spencer, Willits, Helwig & Bailie
Attorneys

March 1, 1949.  T. B. DILWORTH  2,463,025
PISTON

Filed Nov. 13, 1947  2 Sheets-Sheet 2

Inventor
Thomas B. Dilworth
By
Spencer, Willits, Helwig & Baillie
Attorneys

Patented Mar. 1, 1949

2,463,025

UNITED STATES PATENT OFFICE 2,463,025

PISTON

Thomas B. Dilworth, Clarendon Hills, Ill., assignor to General Motors Corporation, Detroit, Mich., a corporation of Delaware Application November 13, 1947, Serial No. 785,691

11 Claims. (Cl. 123—193)

This invention relates generally to improvements in internal combustion engines of the reciprocating piston type, and particularly to improvements in pistons for such engines.

For greatest efficiency, modern engines of this type operate with relatively close piston-to-cylinder clearance, which necessitates ample provisions being made for cooling and lubrication of the piston and cylinder to prevent seizures between their respective rubbing surfaces in operation. Also, in modern internal combustion engines, particularly those of the compression-ignition type, relatively high compression ratios are employed for increased efficiency, resulting in high piston and cylinder operating temperatures which further increases the importance of adequate cooling and lubrication of the piston and cylinder. In the event of even a partial failure of either the cooling or the lubrication system in such engines during operation, seizure of a piston is likely to occur resulting in direct damage or destruction of the piston, cylinder and related parts and consequential damage to other parts of the engine by way of excessive structural strains being imposed thereon and/or contamination of the lubricant with metallic chips from the seized cylinder and piston assembly.

While considerable effort has been expended by those skilled in the art in designing cooling and lubricating systems for such engines that will be virtually trouble-free under even the most extreme operating conditions, it is nevertheless well-known that breakdowns do occur in such systems, with attendant severe damage to the engine. In recognition of this fact, various proposals have been advanced in the art to avoid the resultant damage to the engine. Many of these proposals have taken the form of control devices responsive to operating temperature or pressure and capable of shutting off the fuel or ignition supply. Such devices, however, are only partially satisfactory for two principal reasons: Firstly, considerable damage can occur in the interval between the time at which the control device operates and the time at which the engine comes to rest; and secondly, due to their mechanical nature, conditions may arise whereby the control device itself may fail to operate. Further, the relatively high cost of such devices, due to their numerous parts and delicate construction, has prevented their general use.

It is therefore a principal object of this invention to provide a piston for such engines which, upon the occurrence of an undue increase in operating temperature, such as might develop in the event of a failure of its cooling or lubricating system, will inactivate itself, thereby obviating or at least lessening the danger of the piston seizing in the cylinder.

A still further object of this invention is to provide such a piston, in which the means for inactivating itself may be simply and cheaply incorporated.

For a better understanding of these and other objects and the means by which they are attained, reference is made to the following description together with the drawings, in which.

Figure 1:
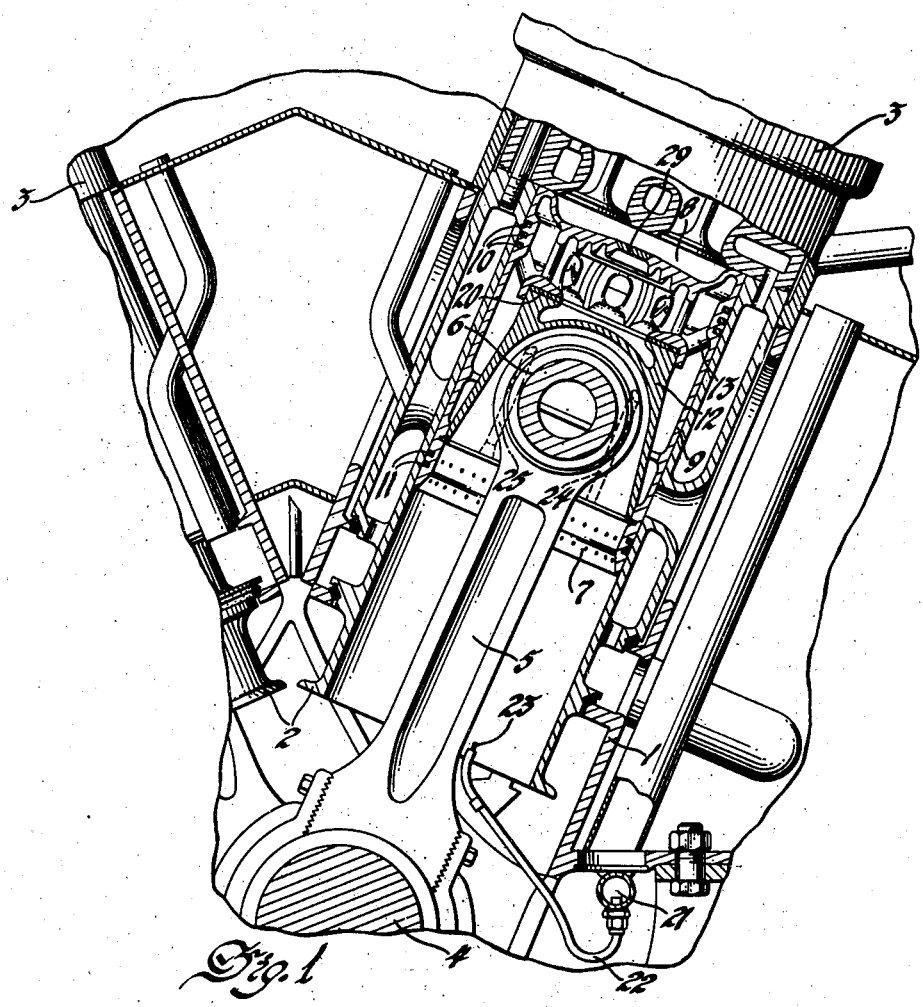
Figure 1 is an axial section perpendicular to the axis of the piston pin showing a piston embodying the invention, in assembled relationship with certain other parts of a two-stroke compression ignition engine having an oil cooling system for the pistons.

Inasmuch as the avoidance of piston seizure in certain modern two-stroke compression-ignition internal combustion engines designed for high operating efficiency is critically dependent upon maintaining adequate piston cooling, such as by directing a stream of the engine lubricating oil against the under side of the head of the piston, the invention is shown in the drawings and thereinafter described with reference to such an engine. It is to be understood, however, that the selection of such an engine is made for purposes of illustration only, and that the invention may also be applied with advantage to other types of reciprocating piston engines.

In Figure 1 will be seen a portion of an engine including a crankcase 1, cylinders 2, cylinder heads 3, crankshaft 4, connecting rods 5, piston pin 6 and piston 7. Piston 7, also viewed in Figure 2, is that shown in Figures 1–4 of the Kettering Patent No. 2,379,359, and includes the usual head portion 8 and skirt portion 9, the latter being provided with compression and oil sealing rings 10 and 11 for sealing against the inner wall of cylinder 2.

While the piston-to-piston pin connection may be made in the more conventional manner wherein the piston pin is supported in piston pin bosses fixed to the skirt or crown of the piston, in the particular piston selected for illustration the piston pin 6 is mounted in piston pin carrier 12, to which the piston is retained against relative longitudinal movement by foot 13 attached to the head and skirt by struts 16 and 17 and by snap retainer ring 18 in groove 19 in skirt 9. Annular end bearing surfaces 14 and 15 coaxial with the longitudinal axis of the piston are provided on foot 13 and carrier 12, with an anti-friction washer 20 therebetween, to permit the piston to rotate axially of the cylinder 2 during engine operation. Axial alignment of carrier 12 and piston 7 is maintained by circumferential bearing of the upper end of the carrier in the annular overhang 27 of foot 13 and circumferential bearing of the lower end of the carrier against the thickened section 28 of the piston skirt 9.

In the particular engine selected for illustration special provision is made (see Figure 1) for cooling the piston during operation. Engine lubricating oil under pressure in gallery 21 is conducted through conduit 22 to oil jet 23, from which the oil is directed in an upward stream into the interior of the piston 7. As shown in Figure 2, passageways 24 and 25, of which 24 is aligned with oil jet 23, extend longitudinally of the piston through the piston pin carrier 12 on opposite sides of the piston pin. Oil directed into passageway 24 from oil jet 23 is conducted through an oblique passageway (not shown) into an upwardly open well 26 in the top of piston pin carrier 12. During engine operation oil in well 26 is dashed by inertia against the underside of the piston head 8 and through the spaces between the struts 16 and 17, from whence it enters the annular space between the piston pin carrier and the inner surface of the piston skirt, filling the latter space up to the level of the upper end of passageway 25 through which the excess drains downwardly into the engine crankcase.

Figure 2:
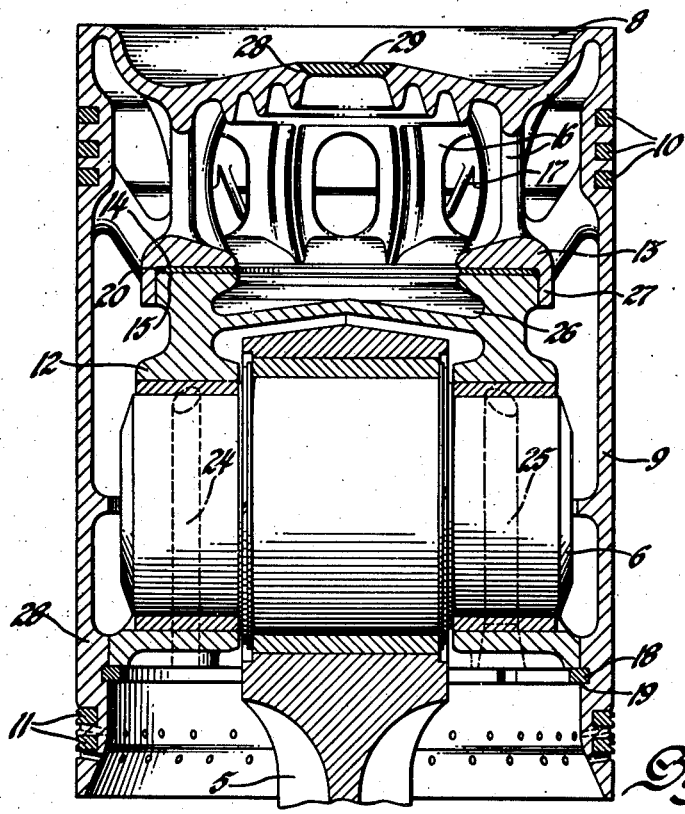
Figure 2 is an axial section in the plane of the axis of the piston pin showing the piston of Figure 1 in assembled relation with the upper portion of the connecting rod.

In forming the head portion 8 of piston 7 shown in Figures 1 and 2 an aperture 28 and closure plug 29 therefor, of circular or other desired configuration, is provided therein, preferably in the vicinity of the hottest operating section of the head.

Plug 29 is composed of a metal having a fusion temperature lower than the temperature at which the particular piston employed would tend to seize in its cylinder. As is well known, piston seizure most commonly results from the piston operating temperature increasing sufficiently to bring about excessive piston expansion to the point at which the piston-to-cylinder clearance is taken up. Inasmuch as factors such as piston-to-cylinder clearance, piston diameter and thermal coefficient of expansion of the piston, etc., vary with different engine designs, no single metal for use in making the plug 29 would be satisfactory for all engines. The material for plug 29 may, however, be readily selected by first determining the piston temperature at which piston seizure will occur in the particular engine employed and then choosing a plug material which has a fusion temperature sufficiently below that to provide for the desired margin of safety. A pure metal, for example, aluminum, zinc, lead or tin, or an eutectic alloy which melts without preliminary softening is deemed preferable for reasons of greatest sensitivity.

As shown most clearly in Figure 2, plug 29 may be secured by casting it in place in the piston head 8, the walls of aperture 28 acting as the lateral faces of the mold.

Figure 3:
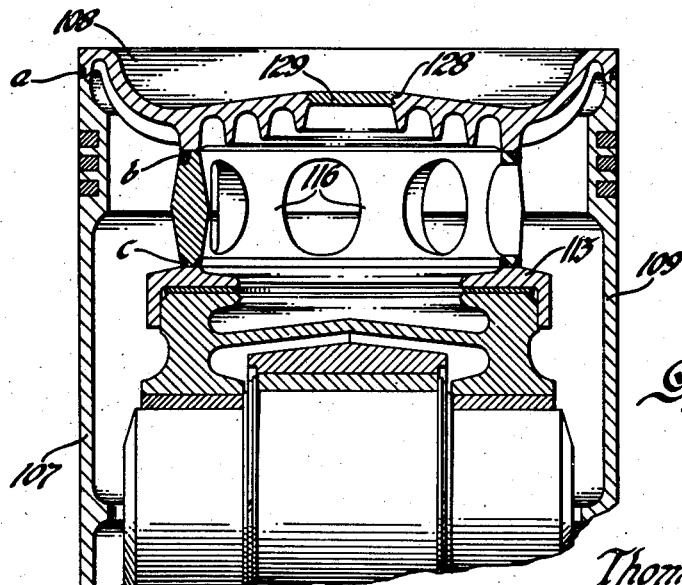
Figure 3 is a view similar to Figure 2 showing a modified form of the invention embodied in a modified constructional form of piston.

Figure 3 shows an alternative construction in which the piston head 108 is provided with a taper-threaded aperture 128 in which a taper-threaded plug 129, otherwise similar to plug 29, is secured by tightening in the usual manner of threaded connections. This threaded plug construction has the advantage of simplicity of original installation and replacement, though greater care must be exercised therein to obtain a satisfactory heat conducting bond between plug and piston head. The piston 107 as shown in Figure 3 differs from that in Figures 1 and 2 in that head 108, skirt 109, struts 116 and foot 113 are formed as separate sections and subsequently welded together as shown at points a, b and c. Also in this piston, no radial struts such as shown at 17 in Figure 2 are included.

Figure 4:
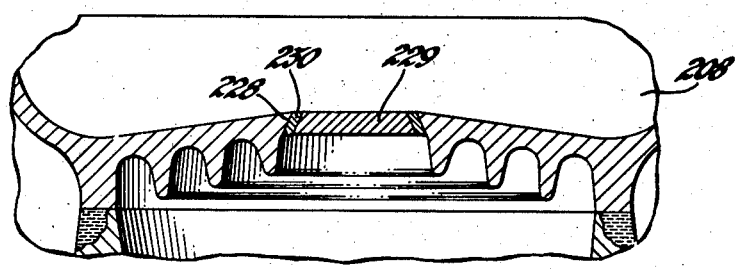
Figure 4 is an enlarged view of a portion of a piston embodying another modification of the invention.

Figure 4 shows another alternative construction in which a plug 229, of material having substantially the same or a higher melting point than that of the piston head 208, is secured in aperture 228 by brazing or welding it to the surrounding metal of the piston head, using a brazing or welding material 230 which will melt out at the desired temperature below that at which the piston would tend to seize.

In the particular engine described which incorporates engine oil jet cooling of the piston, in the event of a failure of the jet cooling system the temperature of the piston would tend to increase substantially. However, instead of such a temperature increase leading to a seizure of the piston the lower melting point metal will melt out of the piston head, thereby inactivating the cylinder by reducing the amount of combustible mixture drawn into the combustion chamber and, further, by preventing the attainment in that cylinder of compression pressures sufficient for ignition. With the cylinder thus inactivated the temperature of the piston drops rapidly and a seizure is avoided.

While the invention disclosed is believed to have particularly advantageous application to engines incorporating special piston cooling arrangements, it is also broadly applicable to other reciprocating piston engines, either of compression-ignition or of spark-ignition type, wherein the margin of safety against the occurrence of piston seizure is necessarily narrow for various reasons incidental to their particular design. In applications of the invention to four-cycle engines, the additional piston strokes between firings effect an even more rapid cooling of the piston after the plug melts out of the head, than in the case of two-cycle engines. In spark-ignition engines, upon the aperture in the piston head opening up at excessive operating temperature, the same result with respect to reducing the amount of charge is obtained as in the case of compression-ignition engines.

I claim:
1. A piston having a head portion, said head portion having an aperture therein and a closure member for said aperture composed of a material having a lower fusion temperature than that of the material of said head portion.

2. A piston having a head portion, said head portion having an aperture therein for relieving normal compression pressures opposing the piston in operation, and a fusible plug normally closing said aperture but adapted to melt at a desired temperature below that at which the piston would tend to seize in its cylinder.

3. In a piston for internal combustion engines, means for automatically inactivating the piston upon the latter reaching an operating temperature above which a seizure of the piston in its cylinder would tend to occur, said means consisting of a member normally closing an aperture in the piston head, said member being composed of a material which melts at the temperature desired for inactivating the piston.

4. In a piston for compression ignition engines which incorporate independent forced liquid piston cooling systems, means for preventing the piston reaching an excessive operating temperature in the event of a failure of said cooling system, consisting of a fusible plug normally closing an aperture in the piston head and composed of a metal having a melting point temperature safely below said excessive piston operating temperature.

5. In an internal combustion engine, a cylinder, a piston in said cylinder having a passage through which fluid may escape from the combustion chamber, and a member which normally closes said passage but which moves to an inoperative position when the temperature of the piston exceeds a preselected value.

6. In an internal combustion engine, a cylinder, a piston in said cylinder having a passage through which fluid may escape from the combustion chamber, and a member which is normally held in a position to close said passage by material having a fusion temperature lower than the temperature at which the piston would tend to seize in the cylinder, but which is movable to an inoperative position when the temperature of the piston exceeds the fusion temperature of said material.

7. In an internal combustion engine, a cylinder, a piston in said cylinder having an area in its wall which fuses at a temperature lower than that at which the piston would tend to seize in the cylinder.

8. In an internal combustion engine, a cylinder, a piston in said cylinder having a passage through which fluid may escape from the combustion chamber, and means normally closing said passage, said means comprising a plug and a body of fusible material bonded to the plug and to the portion of the piston surrounding said passage, said material having a lower fusion temperature than the temperature at which the piston would tend to seize in the cylinder.

9. In an internal combustion engine, a cylinder, a piston in said cylinder having a passage through which fluid may escape from the combustion chamber, and a member normally closing said passage and composed of a material which fuses at a lower temperature than that at which the piston would tend to seize in the cylinder, said member and said piston being threadedly interengaged.

10. A piston having a head portion, said head portion having an aperture therein, a closure member for said aperture secured to said head portion by a fusible material which fuses at a temperature lower than that at which the piston would tend to seize in its cylinder.

11. A piston having a head portion, said head portion having an aperture therein, a closure member for said aperture threadedly secured to said head portion, said member being composed of a material which fuses at a temperature lower than that at which the piston tends to seize in its cylinder.

THOMAS B. DILWORTH.

No references cited.